Figure 1:
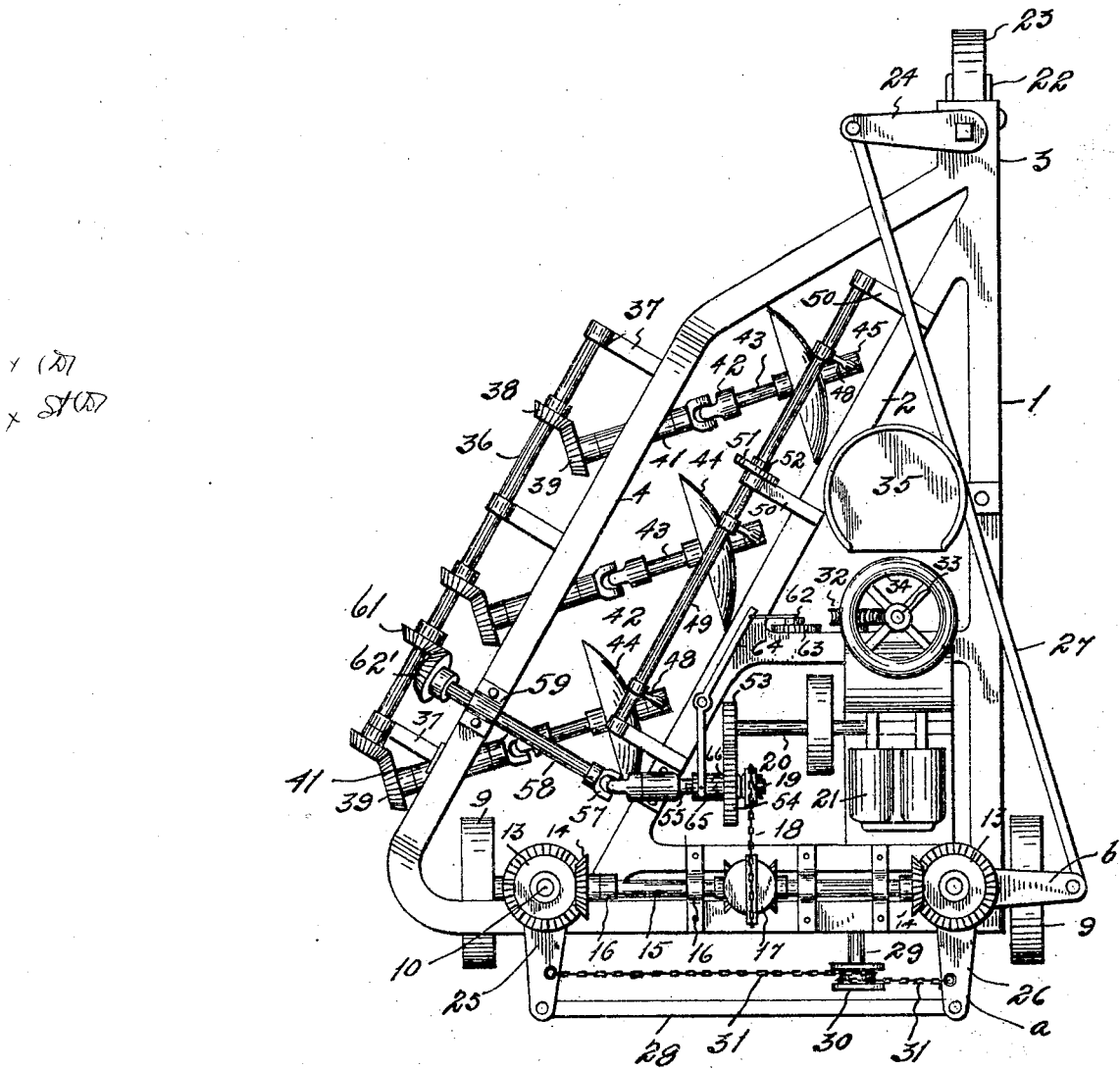

C. J. JOHNSON.
TRACTION GANG PLOW.
APPLICATION FILED JAN. 2, 1909.

954,969.

Patented Apr. 12, 1910.
2 SHEETS—SHEET 1.

WITNESSES:

INVENTOR
Charles J. Johnson,
BY
ATTORNEY

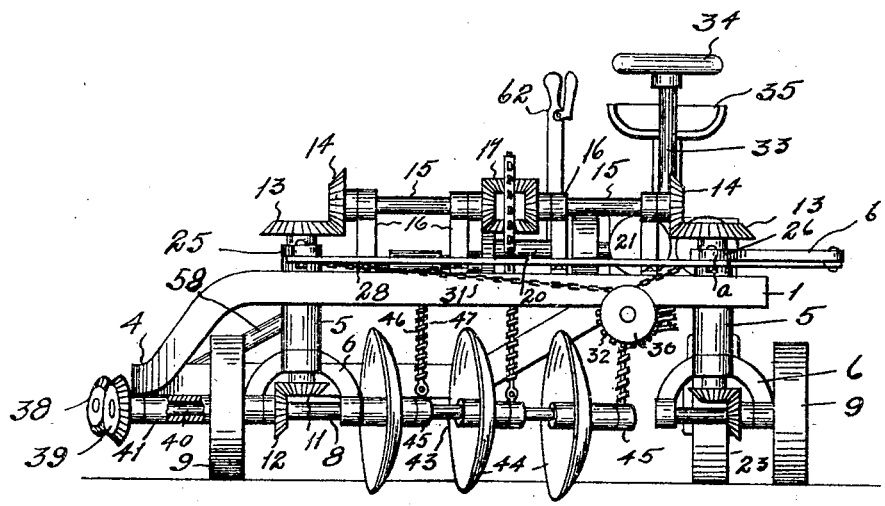
Fig. 2.
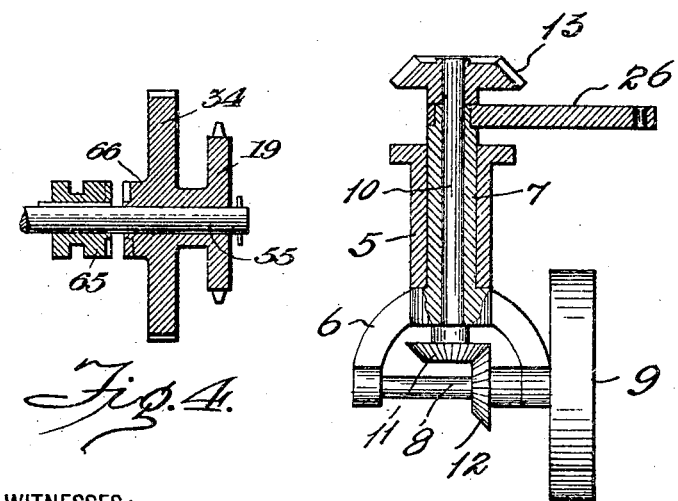
Fig. 4.
Fig. 3.
INVENTOR
Charles J. Johnson

UNITED STATES PATENT OFFICE.

CHARLES J. JOHNSON, OF CLIFTON, TEXAS, ASSIGNOR OF ONE-HALF TO JAS. J. LUMPKIN, OF MERIDIAN, TEXAS.

TRACTION GANG-PLOW.

954,969. Specification of Letters Patent. Patented Apr. 12, 1910.

Application filed January 2, 1909. Serial No. 470,328.

*To all whom it may concern:*

Be it known that I, CHARLES J. JOHNSON, citizen of the United States, residing at Clifton, in the county of Bosque and State of Texas, have invented certain new and useful Improvements in Traction Gang-Plows, of which the following is a specification.

My invention relates to new and useful improvements in traction gang-plows.

The object of the invention resides in the production of a plow involving certain improvements on the plow set forth in the Letters Patent granted to me May 21st, 1907, and numbered 854,423. These improvements reside more particularly in the frame, transmission of power, wheel bearings, and means for guiding the rear caster wheel as well as the front caster wheel.

Finally the object of my invention is to provide a device of the character described that will be strong, durable, simple, efficient and comparatively inexpensive to construct, also one in which the several parts will not be liable to get out of working order.

With the above and other objects in view, my invention has particular relation to certain novel features of construction and operation, an example of which is described in the following specification and illustrated in the accompanying drawings, wherein:

Figure 1 is a plan view, Fig. 2 is a front elevation, and Fig. 3 is a detail of one of the front caster wheels and its support, parts being shown in section. Fig. 4 is a detail longitudinal sectional view showing a portion of one of the power transmission shafts carrying a clutch, and a rigidly connected gear and sprocket wheel.

In the drawings, the numeral 1 indicates the main frame of the plow, the said frame having, in plan view, approximately the form of a right angle triangle, the same having however, an intermediate obliquely set bar 2 and a rearwardly projecting bearing portion 3. Along its angular side, the frame is formed with a downwardly bent hanger portion 4, a part of which extends horizontally for some distance along the side of the frame about midway between the ground line and the main portion of the frame. At each side of the front of the frame depending bearing sleeves 5 are secured thereto. These sleeves rest on yoke-shaped axle bearings 6, each of which is provided with an upwardly extending hollow stem 7 passing through the sleeve so as to turn therein and projecting some distance above the same. The axle bearing 6 receives a horizontal axle 8 on the projecting end of which, a traction or caster wheel 9 is mounted at each side of the frame, each wheel 9 being secured firmly to its axle which is arranged to revolve in the bearing 6. Through each stem a vertical shaft 10 passes, projecting above and below the same and carrying on its lower end a miter gear 11 meshing with a miter gear 12 fixed on the axle 8 within the yoke-shaped bearing 6. A miter gear 13 is fixed on the upper projecting end of each shaft meshing with a miter gear 14 fixed on the end of a horizontal driving shaft 15 mounted in bearings 16 on top of the front portion of the frame. It is to be understood that there are two driving shafts which extend from a suitable compensating gearing 17. The latter is driven by a sprocket chain 18 extending from a sprocket wheel 19 rigidly attached to a gear 54 which is loose upon a shaft 55. The gear 54 is driven by a gear 53 upon the shaft 20 of a suitable engine mounted on the frame as shown in Fig. 1.

A caster bearing 22 supporting a caster wheel 23 is swiveled in the rear portion 3 of the frame. The upper end of the bearing which projects above the portion 3 has rigidly attached thereto, a guiding arm 24 projecting laterally on the inside of the frame. A similar arm 25 is attached to the stem of the left hand axle bearing 6 and projects forward as shown in Figs. 1 and 2; while on the right hand stem a double arm 26 is secured having its portion *a* extending forward parallel with the arm 25 and its portion *b* extending laterally on the outside of the frame and parallel with the arm 24. The arm 24 and the portion *b* have pivotal connection with the ends of a link 27 extending diagonally over the frame; while the ends of the arm 25 and portion *a* have pivotal connection with the ends of a link 28 extending substantially parallel with the front of the frame. It is apparent that the wheels thus connected can be controlled and simultaneously guided, all swinging in unison. For guiding or steering the plow, a steering shaft 29 is suitably supported on the under side of the frame and has fixed on its forward end, a drum 30 about which a chain 31 is coiled and fastened, the ends of the chain extending from each side of the drum across the front of the frame and connected to the arm 25 and the portion *a* of the arm 26. Upon rotating the shaft and revolving the drum, the chain is wound thereon on one side and unwound on the other thus swinging the arms and the caster wheels through the agency of the connections above described. The shaft 29 terminates just in rear of the engine 21 and has fixed thereon a worm gear 32 which is operated by a steering post 33 carrying a steering wheel 34 on its upper end which stands in front of a driver's seat 35 suitably supported on the frame.

A counter shaft 36 is supported in bearings 37 extending from the hanger portion 4 of the frame. This shaft extends substantially parallel with the hanger and at an angle to the longitudinal center of the frame. Bevel gears 38 are made fast on the shaft and mesh with bevel gears 39 fixed on the ends of shafts 40 revolving in sleeves 41 fixed to the under side of the hanger 4 and extending at an angle rearwardly. Each shaft 40 has connection at its inner end with a knuckle joint 42 which in turn is connected with a disk shaft 43 having a suitable concavo convex disk 44 fixed thereon. Motion transmitted to the counter shaft 36 will by means of the gears 38 and 39 be conveyed to the shafts 40 and 43, thus revolving the same and the disks 44. The free end of each shaft 43 is supported in a bearing collar 45 which latter is attached to the lower end of the connecting rod 46. This connecting rod is surrounded by a coiled spring 47 bearing between the collar and an arm 48 mounted on a rock shaft 49 and through which arm the connecting rod passes. The disks are thus yieldably held to their work as will be apparent. The arm connected to each rod is made fast on the shaft 49 which is mounted to rock in bearings 50 extending from the frame. To the center bearing a segment 51 is attached; while a lever 52 fixed on the shaft has locking engagement with the segment so that by swinging the said lever, the shaft 49 may be rocked, thus raising or lowering the disks and their shafts which is permitted by the knuckle joints 42.

For transmitting motion to the counter shaft 36 the pinion 53 is fixed on the end of the engine shaft and meshes with the gear 54 loosely confined on the end of the clutch shaft 55 mounted in a bearing 56 secured on the frame. The opposite end of the clutch shaft is connected by a knuckle joint 57 with a transmission shaft 58 mounted in a bearing 59 on the hanger 4. A miter gear 62' is fixed on the lower end of the shaft 58 and meshes with a similar gear 61 fixed on the counter shaft 36.

It is obvious that the engine 21 not only furnishes power for propelling the plow but also for revolving the disks. When the plow is being transported from place to place and propelled by its own power, it is not desirable to operate the disks. Therefore the latter are raised by rocking the shaft 49 and the transmission of power to the clutch shaft 55 is interrupted by swinging a lever 62 having rocking engagement with a segment 63 mounted on the frame adjacent the seat 35. This lever has connection with a bell crank lever 64 pivoted on the frame and loosely engaging at its free end a clutch sleeve 65 keyed on the shaft 55 and adapted to engage the clutch hub 66 of the gear 54. Thus when the lever 62 is swung, the clutch sleeve 65 will be moved out of engagement with the clutch hub and the gear 54 permitted to revolve idly on the clutch shaft.

It will be noted that the improved machine herein described is more practical, substantial and compact than that shown in my previous patent being more easily controlled and less liable to become inoperative. It will be further observed that the transmission of power is more direct and the means for steering and guiding more certain and positive. I further wish to state that the diameters of the various gears may be varied and the comparative speeds of rotation of the various parts controlled and regulated.

What I claim, is:

1. In a traction gang plow, the combination with a frame and traction wheels supporting the same, of a plurality of furrow opening disks yieldably supported from the frame, flexible shafts on which disks are mounted supported from the frame, a counter shaft supported from the frame and arranged to transmit motion to the flexible shafts, an engine mounted on the frame, driving means associated with the engine, a flexible shaft arranged to transmit motion from the driving means to the counter shaft, separate means for transmitting motion to the traction wheels, and means for steering and guiding the traction wheels in unison.

2. In a traction gang plow, the combination with the frame thereof, of traction disks supported therefrom, of traction wheels and supports therefor, each comprising a bearing sleeve secured to the frame, a yoke-shaped axle bearing, a hollow stem integral with said bearing projecting through the sleeve and extending above the same, an axle extending through the bearing, a wheel fixed on the axle, a shaft extending through and beyond the stem, a gearing transmitting motion from the shaft to the axle, a guiding arm held against rotation on the upper end of the stem, and a gear secured on the upper end of the shaft, the yoke-shaped bearing having bearings receiving the axle at each end.

3. In a traction gang plow, the combination with the frame thereof, of traction wheels supporting the same, swivel bearings for the wheels, rigid swinging links connecting the swivel bearings adapting them to be turned in unison, a steering mechanism whereby the wheels may be manually turned, an engine mounted on the frame, mechanism communicating rotation from the engine to the wheels, a plurality of rotatable disks, flexible shafts carrying the disks, a counter-shaft from which the flexible shafts are operated, a flexible shaft communicating rotation to the counter-shaft, mechanism communicating rotation to the last named flexible shaft, and means of interrupting the action of the last named mechanism.

In testimony whereof I have signed my name to this specification in the presence of two subscribing witnesses.

CHARLES J. JOHNSON.

Witnesses:
JULIUS M. JENSUN,
GEO. C. PETERSON.